(12) United States Patent
Nakagawa et al.

(10) Patent No.: US 6,525,788 B1
(45) Date of Patent: Feb. 25, 2003

(54) LIQUID CRYSTAL DISPLAY DEVICE

(75) Inventors: Naoki Nakagawa, Kikuchi-gun (JP); Hironori Aoki, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/418,008

(22) Filed: Oct. 14, 1999

(30) Foreign Application Priority Data

Oct. 21, 1998 (JP) ............................................ 10-300051

(51) Int. Cl.[7] .............................................. G02F 1/136
(52) U.S. Cl. .............................. 349/44; 349/42; 349/43; 349/38; 349/110; 349/111
(58) Field of Search ............................... 349/38, 39, 44, 349/111, 110, 42, 43

(56) References Cited

U.S. PATENT DOCUMENTS

| | | | | |
|---|---|---|---|---|
| 5,128,786 A | * | 7/1992 | Yanagisawa | 359/67 |
| 5,159,476 A | * | 10/1992 | Hayashi | 359/54 |
| 5,760,854 A | * | 6/1998 | Ono et al. | 349/38 |
| 5,844,641 A | * | 12/1998 | Jun et al. | 349/38 |
| 5,847,781 A | * | 12/1998 | Ono et al. | 349/44 |
| 6,259,200 B1 | * | 7/2001 | Morita et al. | 313/498 |

OTHER PUBLICATIONS

Bahadur, Liquid Crystals Applications and Uses, 1990, World Scientific, vol. 1, p. 176.*

* cited by examiner

*Primary Examiner*—Kenneth Parker
*Assistant Examiner*—David Chung
(74) *Attorney, Agent, or Firm*—Oblon, Spivak, McClelland, Maier & Neustadt, P.C.

(57) ABSTRACT

The object of the present invention is to provide a TFT array for obtaining a liquid crystal display apparatus of large screen size, of high aperture ratio, and of high precision without degrading the display quality through cross talks or shot blurs. The TFT array of the present invention is a TFT array substrate comprising: a transparent insulating substrate; a plurality of parallel gate electrode lines; a plurality of parallel source electrode lines crossing to the gate electrode lines; a plurality of TFTs located on each crossing point of the gate electrode lines and the source electrode lines; a passivation film formed on the TFTs; a plurality of transparent pixel electrodes formed on said passivation film corresponding to each said TFT and connected to a drain electrode of each said TFT via contact hole; a plurality of floating electrodes which serve as light shielding layer made of a same layer as that of said gate electrode lines formed in a peripheral portion of each said pixel electrode.

6 Claims, 8 Drawing Sheets

LIQUID CRYSTAL DISPLAY DEVICE

BACKGROUND OF THE INVENTION

The present invention relates to a TFT (thin film transistor) array substrate for use in a liquid crystal display apparatus and a liquid crystal display apparatus employing the same.

A liquid crystal display apparatus is generally arranged in that a display material such as liquid crystal is pinched between two substrates one of which is a TFT array substrate having formed thereon TFTs and the other is a counter substrate having formed thereon a color filter, black matrix and counter electrodes, wherein voltage is applied to the display material in a selective manner.

Such a TFT array is generally formed of inverted staggered type thin film transistors and is obtained by forming a gate wiring and gate electrodes on a glass substrate, forming a gate insulating film and semiconductor layer, and forming source electrode lines, source electrodes as well as drain electrode and pixel electrodes. Further, simultaneous with forming the gate electrode lines, electrically floating electrodes are formed at peripheral portions of the pixel electrodes using the same material as that for the gate electrodes for improving the aperture ratio of the pixels. The floating electrodes act to prevent leakage light from pixel periphery portions, and by the provision of these in a concurrent manner with the black matrix on the color filter (CF) side, unnecessary leakage light may be prevented at peripheral portions of the pixel electrodes so as to improve the display quality. With such an arrangement of forming a light shielding layer on the TFT array substrate side, the overlay accuracy between layers of a TFT array substrate can be made to be superior to the overlay accuracy between the CF substrate and the TFT substrate, so that the area of the light shielded portion can be decreased and a high aperture ratio of the pixels can be achieved.

However, since the metallic light shielding layer is provided to be floating in such an arrangement as shown in FIG. 10, coupling capacity $C_1$, $C_4$ between floating electrodes and source electrode lines and coupling capacity $C_2$, $C_3$ between floating electrodes and pixel electrodes exist in a serial manner with respect to each other ($C_1$ and $C_2$ in siries and $C_3$ and $C_4$ in series) so that these capacities caused display deficiencies such as cross talk or shot blurs.

FIG. 7(a) is a plan view of pixels of a conventional TFT array substrate, FIG. 7(b) a partially enlarged view of FIG. 7(a), FIG. 8 a sectional view of a TFT portion, and FIG. 9 a sectional view of a source electrode line portion.

A method for forming a TFT array substrate according to the prior art will now be explained. First, gate electrode lines 3 and floating electrodes 11 are formed of a metal material such as Cr. Then, there are respectively formed a gate insulating film 4, a non-doped amorphous silicon layer 5, and a contact layer 6 of phosphorus doped amorphous silicon. Amorphous silicon is patterned in a form of an island to form source electrode lines 7 and drain electrode 8. After removing unnecessary portion of the phosphorus doped amorphous silicon layer on a channel portion and forming pixel electrodes 9 of transparent electrodes, a passivation film 10 is formed to complete the TFT array.

In a conventional type liquid crystal display apparatus, since the black matrix is formed by arranging a light shielding film of floating electrodes in peripheral portions of the pixel electrodes to achieve a high aperture ratio, the coupling capacities between the source electrodes and floating electrodes as well as pixel electrodes become large so that a drawback was presented that display deficiencies such as cross talks, shot blurs or irregularities in luminance were caused.

The present invention has been made for the purpose of solving such conventionally known problems, and it is an object thereof to realize a TFT array for obtaining a liquid crystal display apparatus of large screen size, high precision and high aperture ratio free of display deficiencies such as luminance blurs or cross talks.

SUMMARY OF THE INVENTION

The TFT array according to the present invention is a TFT array substrate comprising:

a transparent insulating substrate;

a plurality of parallel gate electrode lines;

a plurality of parallel source electrode lines crossing to the gate electrode lines;

a plurality of TFTs located on each crossing point of the gate electrode lines and the source electrode lines;

a passivation film formed on the TFTs;

a plurality of transparent pixel electrodes formed on said passivation film corresponding to each said TFT and connected to a drain electrode of each said TFT via contact hole;

a plurality of floating electrodes which serve as light shielding layer made of a same layer as that of said gate electrode lines formed in peripheral portion of each said pixel electrode.

It is further characterized in that the overlay capacity between the pixel electrodes and floating electrodes is further decreased by forming the passivation film of organic film presenting low dielectric constant.

The thin film transistor array is further characterized in that light shielding characteristics are further increased and high aperture ratio is realized by the provision of extending the floating electrodes under the source electrodes, and in that differences between shots of capacities between source electrode lines and floating electrodes are eliminated by connecting portions of the floating light shielding film being arranged laterally with the source electrode lines between.

Employing the TFT array substrate according to the present invention, it is possible to arrange a liquid crystal display apparatus of high aperture ratio, of large screen size and of high precision free of occurrence of display deficiencies such as cross talks or shot blurs owing to coupling capacities of floating electrodes.

DETAILED DESCRIPTION

The liquid crystal display apparatus according to the present invention will now be explained.

Embodiment 1

Figure 1A:
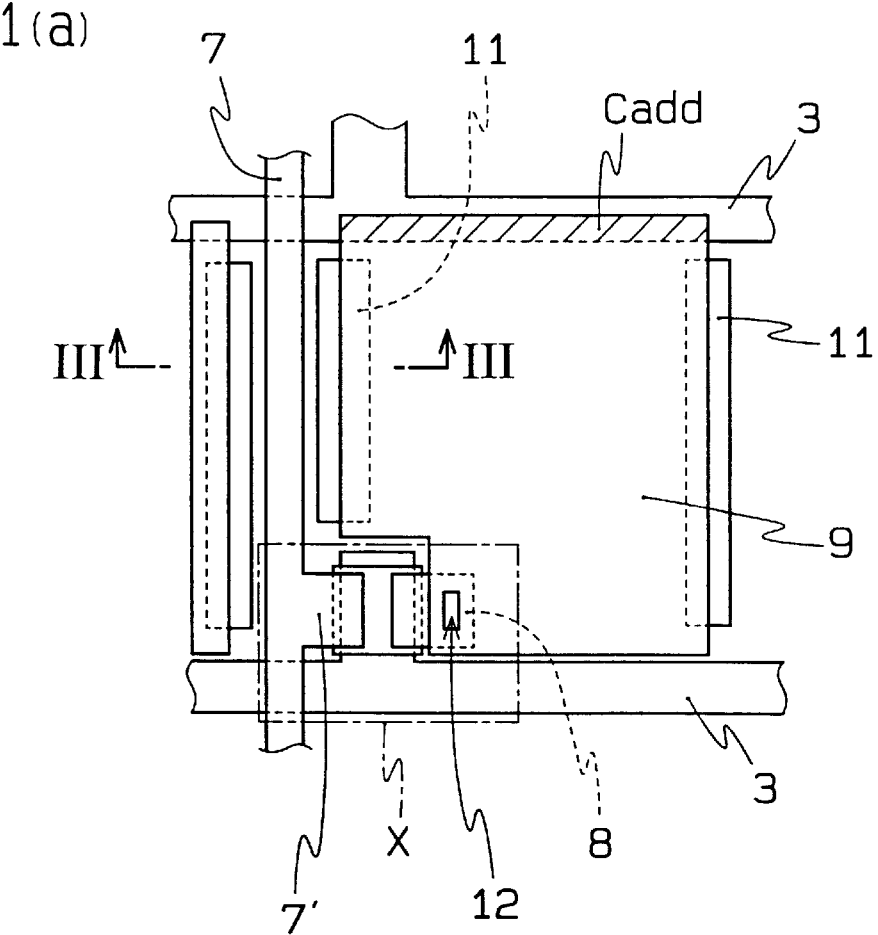
FIG. 1(a) is a plan view of a liquid crystal display apparatus of a first embodiment of the present invention.
Figure 1B:
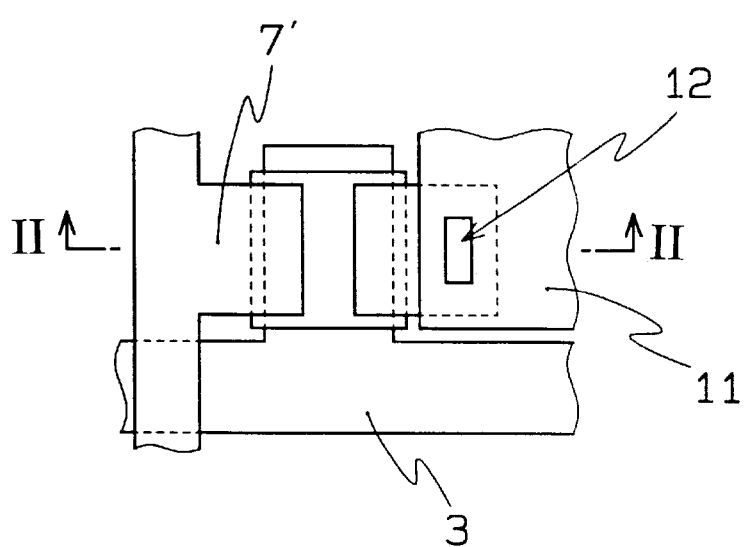
FIG. 1(b) is a partially enlarged view of FIG. 1(a)
Figure 2:
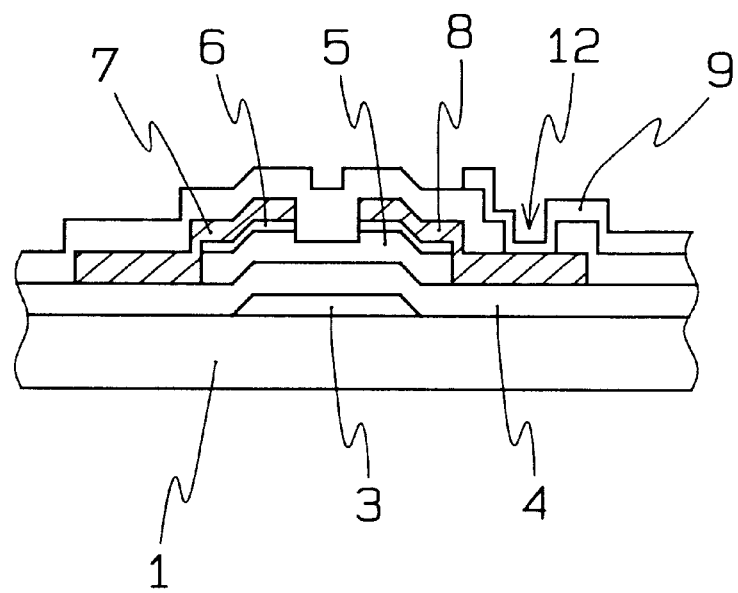
FIG. 2 is a sectional view taken along line A—A of FIG. 1(a)
Figure 3:
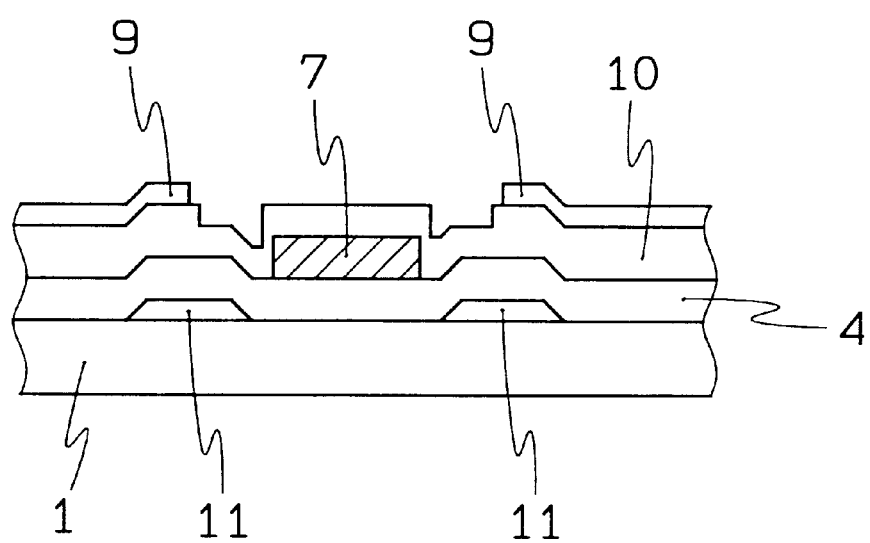
FIG. 3 is a sectional view taken along line B—B of FIG. 1(a)

The TFT array substrate according to the first embodiment of the present invention is arranged, as shown in FIGS. 1 to 3, by forming gate electrodes 3 and floating electrodes 11 onto a transparent substrate 1 either in a single layered structure of Cr or the like or in a multi-layered structure of Cr/Al or the like. There are then formed a gate insulating film 4, a non-doped amorphous silicon layer 5 and a contact layer 6 of phosphorus doped amorphous silicon, respectively. Amorphous silicon is then patterned in a form of an island. Thereafter, there are formed source electrode lines 7, source electrodes 7' and drain electrode 8, respectively, either in a single layered structure of Cr or the like or in a multi-layered structure of Cr/Al, Cr/Al/Cr or the like, and unnecessary portions of the phosphorus doped amorphous silicon layer at a channel portion is then removed. A passivation film 10 is formed of inorganic material of SiNx such as $SiO_2$ or SiN or organic material of acrylic group, and a contact hole 12 is formed on the drain electrode 8. Lastly, pixel electrodes 9 are formed of transparent conductive film to complete the TFT array.

While the above explanations are related to thin film transistors of channel etching type, it is also possible to employ thin film transistors of channel protecting type.

In a TFT array thus obtained, the pixel electrodes 9 are formed after forming the passivation film 10 (reference should be made to FIG. 3), the insulating film between the pixel electrodes 9 and floating electrodes 11 is of double-layered structure of increased film thickness, whereby the overlay capacity can be decreased and the capacity between source electrodes and pixel electrodes through the coupling capacity between the source electrode lines 7 and floating electrodes 11 and the coupling capacity between the floating electrodes 11 and the pixel electrodes 9 can be decreased.

As shown in FIG. 1(a), the storage capacity Cadd corresponds to a capacity of regions at which the gate electrodes 3 and pixel electrodes 9 intersect with each other.

Embodiment 2

Figure 4:
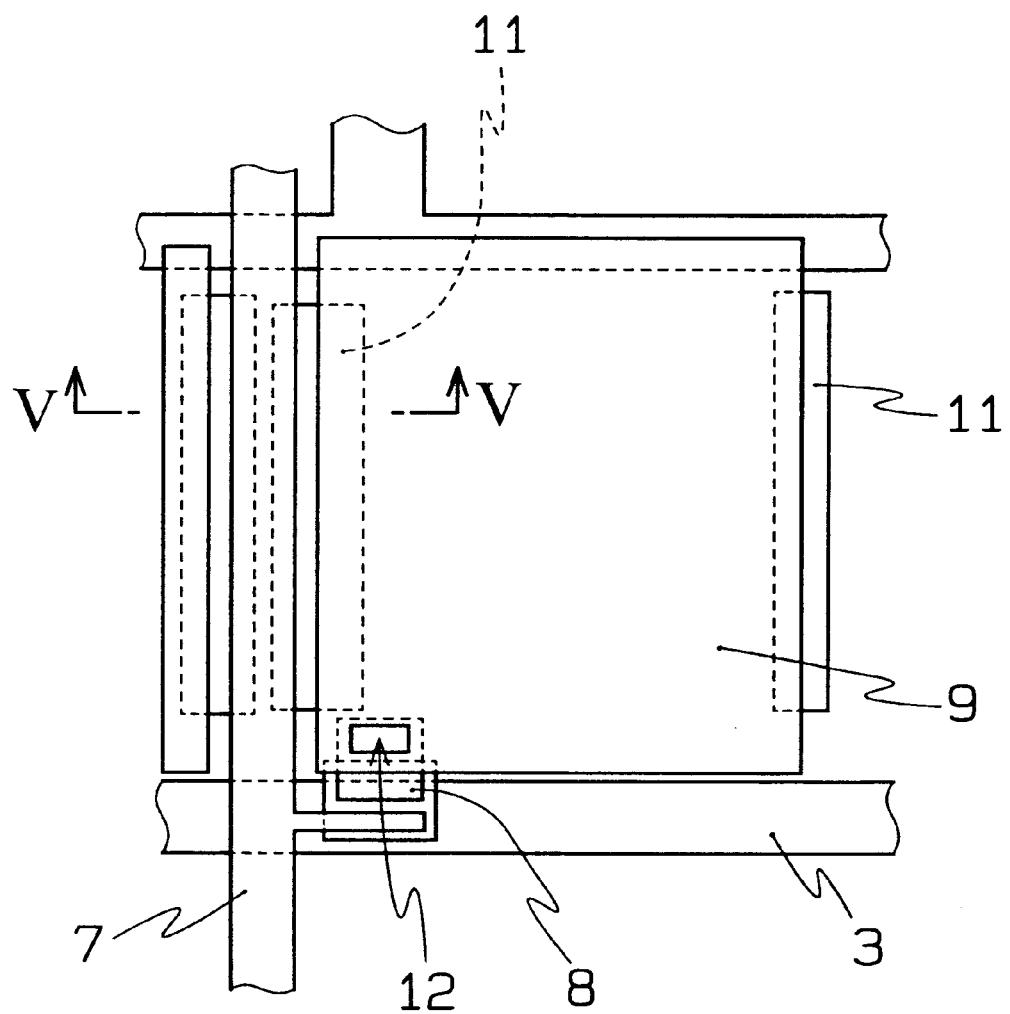
FIG. 4 is a plan view related to a pixel portion of a liquid crystal display apparatus of a second embodiment of the present invention.
Figure 5:
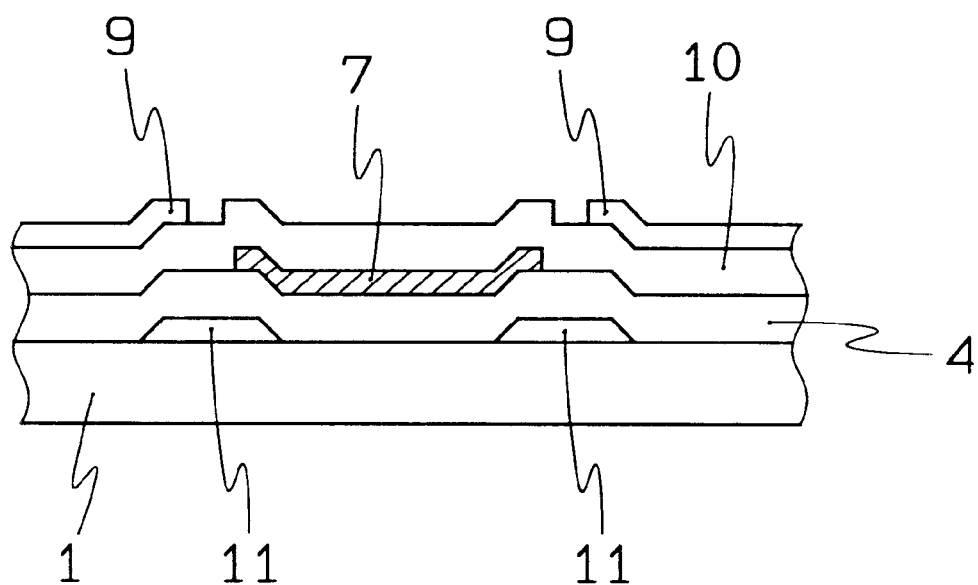
FIG. 5 is a sectional view related to a pixel portion of a liquid crystal display apparatus of the second embodiment of the present invention.

The thin film transistor array substrate according to the second embodiment is arranged, as shown in FIGS. 4 and 5, by forming floating electrodes 11 as to extend under source electrode lines 7 in an overlying manner, whereby light shielding characteristics can be further improved.

Embodiment 3

Figure 6:
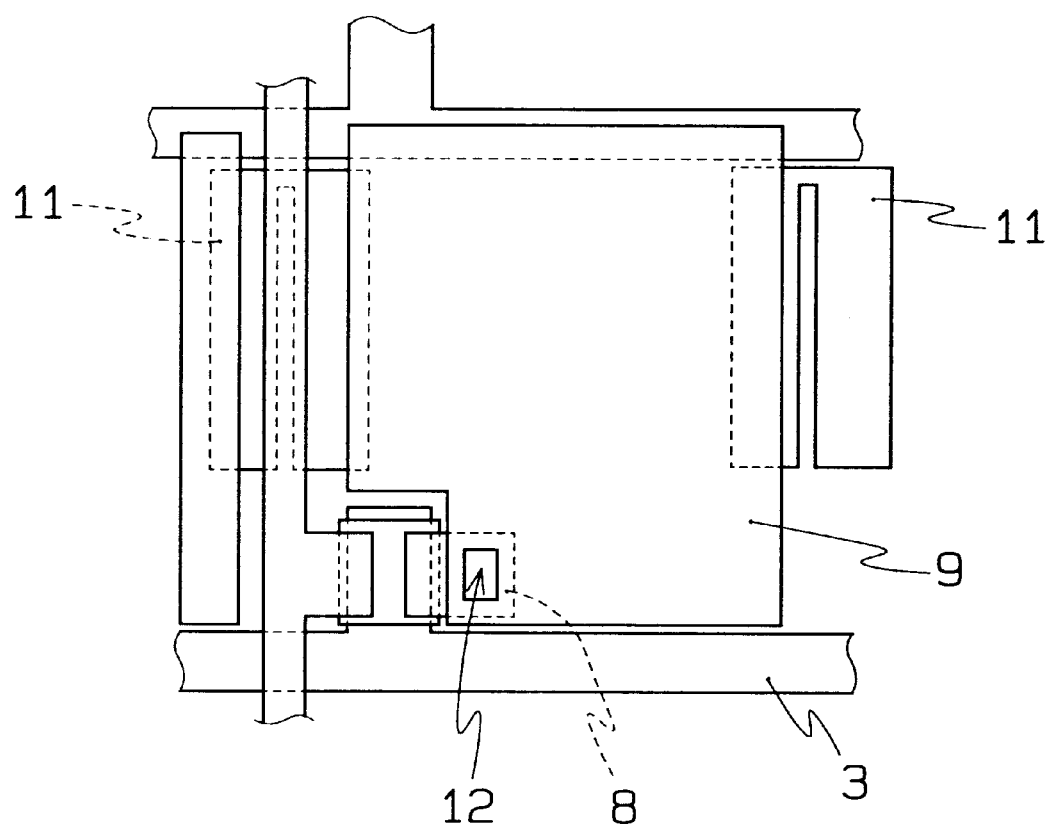
FIG. 6 is a plan view of a pixel portion of a liquid crystal display apparatus of a third embodiment of the present invention.
Figure 7A:
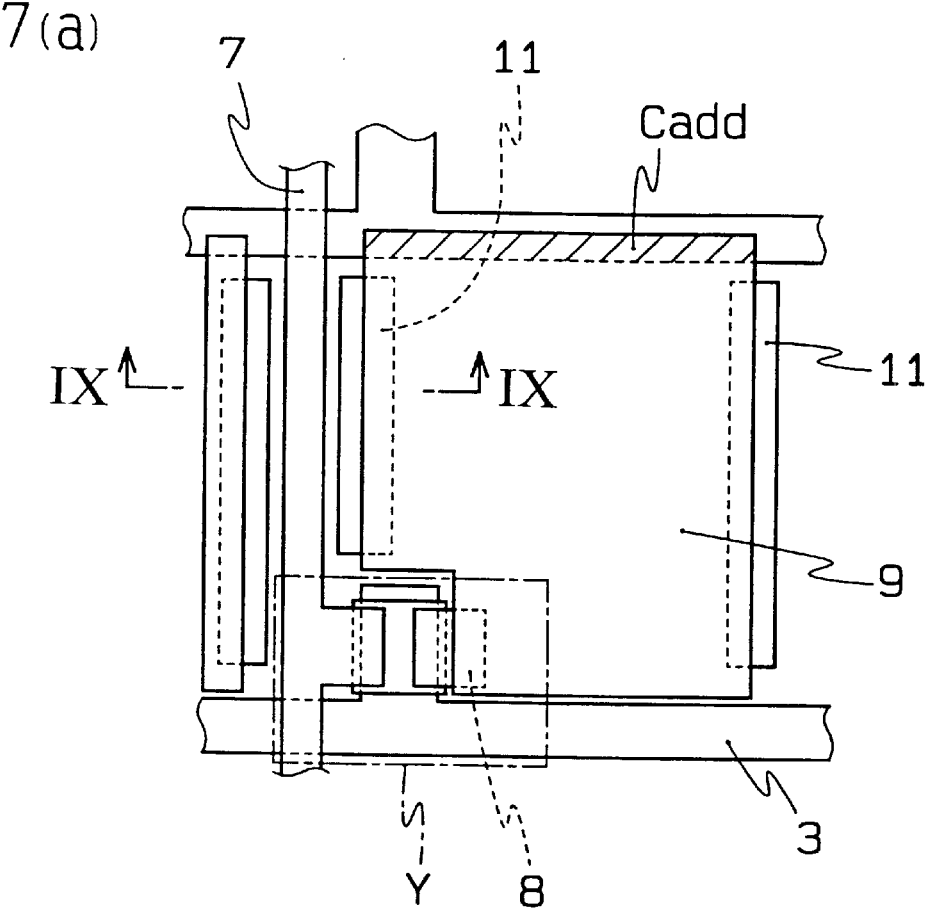
FIG. 7(a) is a plan view of a conventional TFT array substrate.
Figure 7B:
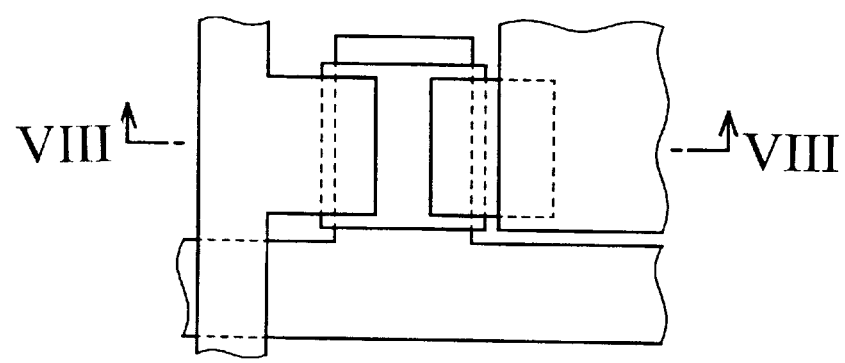
FIG. 7(b) is a partially enlarged view of FIG. 7(a)
Figure 8:
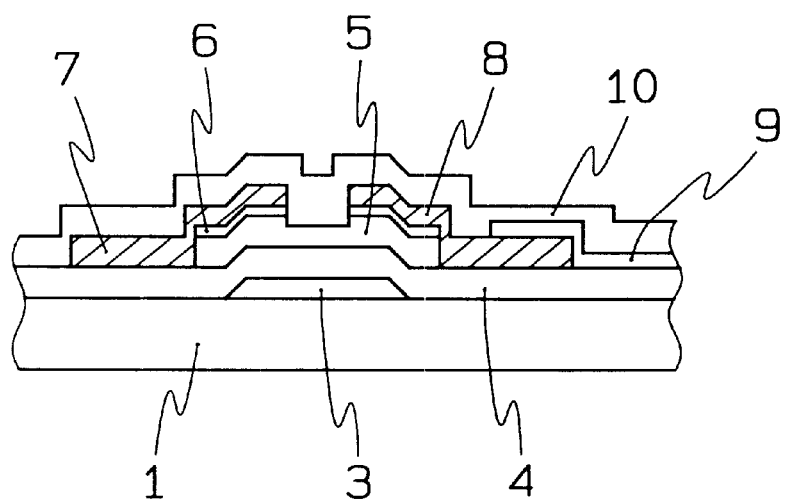
FIG. 8 is a sectional view of a TFT portion.
Figure 9:
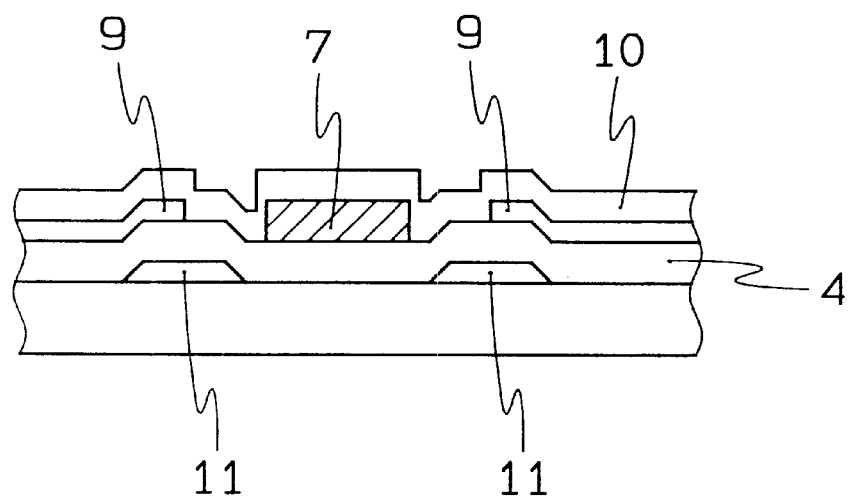
FIG. 9 is a sectional view of a source electrode line portion.
Figure 10:
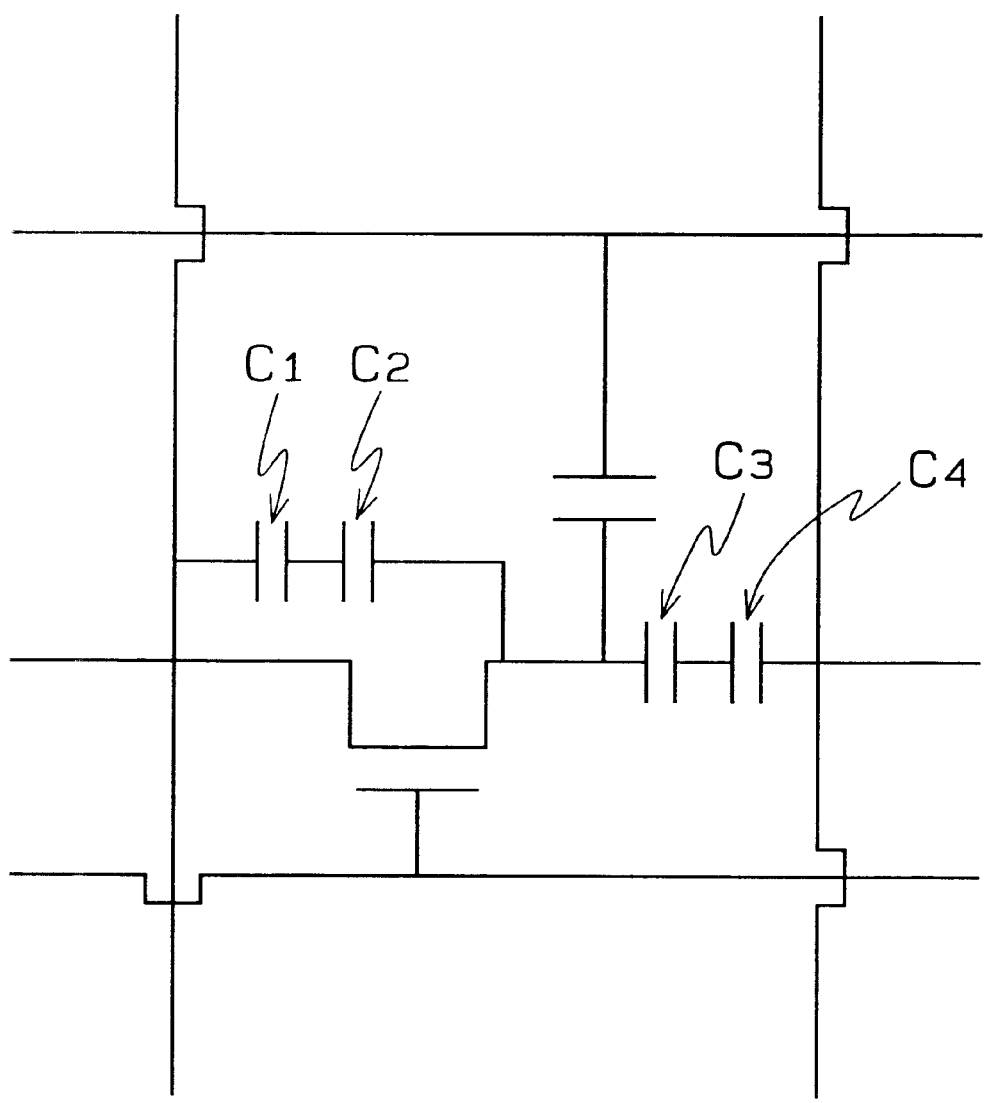
FIG. 10 is an equivalent circuit of the transistor array substrate in accordance with an exemplary embodiment of the invention.

The thin film transistor array substrate according to the third embodiment 2 is arranged, as shown in FIG. 6, in that portions of the floating electrodes 11 laterally arranged with the source electrode lines 7 between are electrically connected with each other. With this arrangement, differences between shots of overlay coupling capacity patterns between source electrode lines 7 and floating electrodes 11 can be reduced.

The TFT array thus arranged is capable of decreasing the capacity between the pixel electrodes 9 and source electrode lines 7 since the insulating film between the pixel electrodes 9 and floating electrode 11 that function as a black matrix assumes a double-layered structure of gate insulating film 4 and passivation film 10. With this arrangement, variations in pixel potentials owing to fluctuations in source signals can be restricted to improve the display quality.

According to the TFT array substrate of the present invention, variations in pixel potentials owing to coupling capacity between floating electrodes and source electrodes and coupling capacities between floating electrodes and pixel electrodes can be restricted, wherein the floating electrodes are formed at peripheral portions of the pixel electrodes to function as a black matrix for achieving a high aperture ratio. With this arrangement, a liquid crystal display apparatus presenting high display qualities and free of cross talks or shot blurs can be realized.

What is claimed is:

1. A TFT array substrate comprising:

a transparent insulating substrate;

a plurality of gate electrode lines arranged in parallel on the insulating substrate;

a gate insulating film formed on the gate electrodes and the transparent insulating substrate;

a plurality of parallel source electrode lines crossing to the gate electrode lines;

a plurality of TFTs located on each crossing point of the gate electrode lines and the source electrode lines;

a passivation film formed on the TFTs;

a plurality of contact holes formed on each drain electrode of said TFTs, said contact holes serving to connect said drain electrodes with said pixel electrodes;

a plurality of transparent pixel electrodes formed on said passivation film corresponding to each said TFT and connected to a drain electrode of each said TFT via said contact hole;

a plurality of floating electrodes which serve as light shielding layer made of a same layer as that of said gate electrode lines formed in a peripheral portion of each said pixel electrode, said floating electrodes being covered with insulating film under the pixel electrodes, neighboring two floating electrodes on both sides of a source line being electrically connected with the other.

2. A TFT array substrate of claim 1, wherein the floating electrodes are provided in such a manner that said floating electrodes are extended to a lower side of said source electrode lines;

a plurality of source electrode lines being crossed with said plurality of gate electrode lines;

a plurality of TFT's located at portions where said plurality of gate electrode lines are crossed with said plurality of source electrode lines;

passivation films formed on said plurality of TFT's, each of said passivation films comprising a single layer including an organic insulating film made of an organic material or a multi-layer including said organic insulating film and an organic insulating film made of an inorganic material; and a plurality of pixel electrodes formed on said passivation films.

3. The TFT array substrate according to claims 1 or 2 wherein said passivation film comprises a single layer including an organic insulating film or a multi layer including an organic insulating film made of an organic material and an inorganic insulating film made of an inorganic material.

4. The liquid crystal display apparatus of claim 1,
wherein a TFT array substrate is driven by a column inversion driving method or a dot inversion driving method.

5. The TFT array substrate according to claim 1 wherein said passivation film comprises a single layer including an organic insulating film or a multi layer including an organic insulating film made of an organic material and an inorganic insulating film made of an inorganic material.

6. The TFT array substrate according to claim 1, wherein said insulating film under the pixel electrodes includes the gate insulating film and the passivation film.

* * * * *